United States Patent

[11] 3,603,424

| [72] | Inventors | Ernest R. Blood;<br>Edward J. Ohms, both of Washington, Ill. |
|---|---|---|
| [21] | Appl. No. | 802,058 |
| [22] | Filed | Feb. 25, 1969 |
| [45] | Patented | Sept. 7, 1971 |
| [73] | Assignee | Caterpillar Tractor Co.<br>Peoria, Ill. |

[54] AUXILIARY EMERGENCY STEERING FOR ARTICULATED VEHICLES
1 Claim, 1 Drawing Fig.

[52] U.S. Cl. ................................................. 180/79.2 B,
180/6.2, 180/6.64
[51] Int. Cl. ................................................. B62d 5/06
[50] Field of Search ........................................... 180/6.2,
6.24, 6.3, 6.64, 79.2, 79.2 B

[56] References Cited
UNITED STATES PATENTS

| 2,360,843 | 10/1944 | Boldt | 180/6.3 |
| 3,129,035 | 4/1964 | Alfieri | 180/6.3 X |
| 3,393,760 | 7/1968 | Matson | 180/79.2 X |

Primary Examiner—Leo Friaglia
Assistant Examiner—John A. Pekar
Attorney—Fryer, Tjensvold, Feix, Phillips & Lempio ABSTRACT: Emergency steering for a vehicle which is normally steered by a hydraulic fluid system and has fluid actuated brakes. When pressure in the steering system falls below a safe valve air from the brake system is directed through a valve controlled by the steering system selectively to the right brake or left brake depending upon the direction in which the steering wheel is turned thus causing what is known as steering by braking.

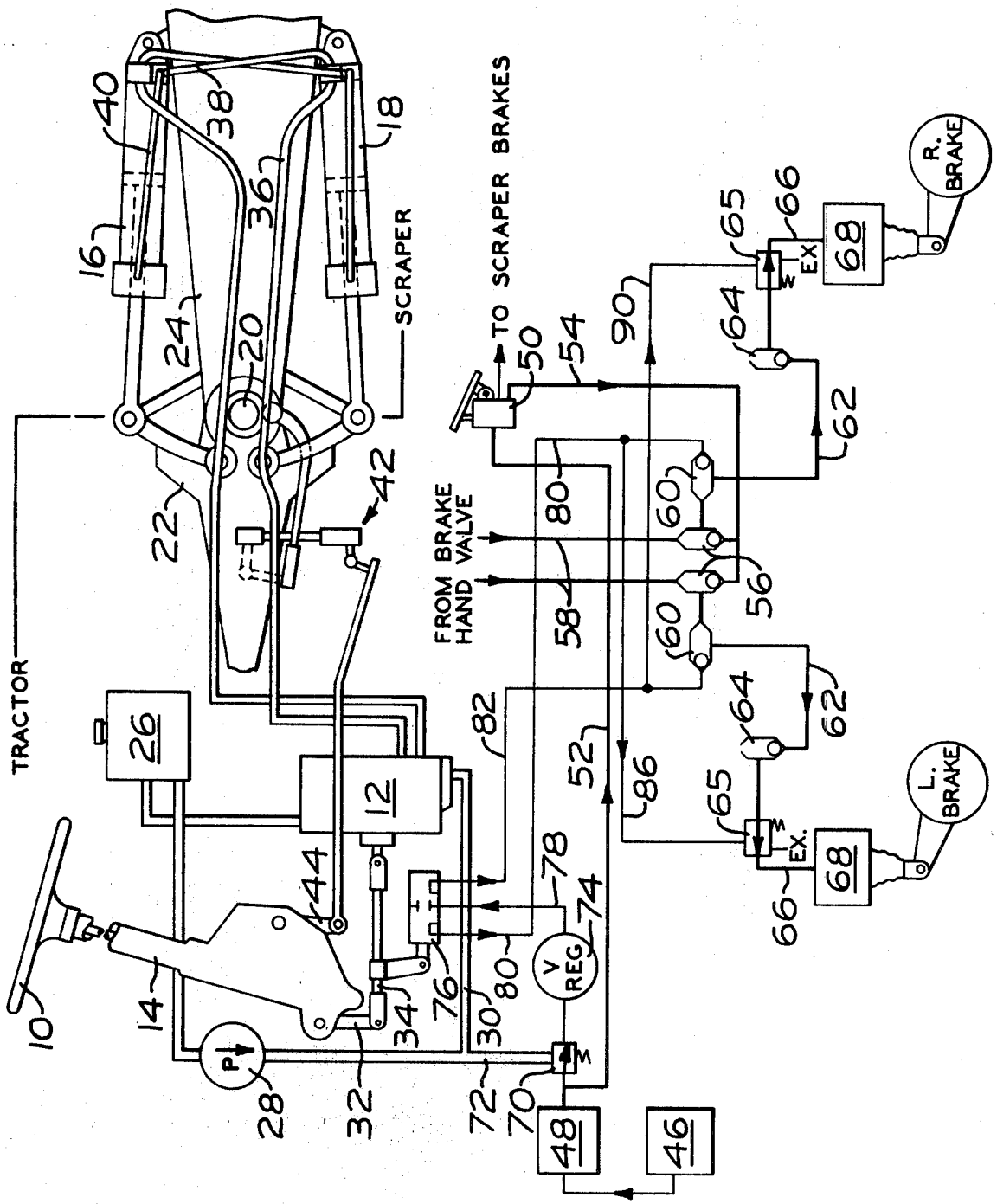

AUXILIARY EMERGENCY STEERING FOR ARTICULATED VEHICLES

Safety regulations of various Government agencies have required auxiliary steering on large earthmoving equipment for protection in the event of loss of hydraulic pressure in the hydraulic steering system. A commonly used type of hydraulic system is employed on articulated vehicles such as scrapers or the like where a two wheel tractor unit is pivoted to and draws a two wheel trailer unit. Steering is accomplished in the manner fully disclosed in the U.S. Pat. to Gustafson for Tractor Steering Mechanism No. 2,614,644 as well as in the later U.S. Pat. to Baer and Herr for Hydraulic Steering Mechanism for Articulated Vehicles No. 3,130,806. These patents show hydraulic jacks extending between the tractor and trailer to cause angular adjustment of the two units about the pivotal connection and consequent steering. A valve controlling flow selectively to the jacks in actuated by the steering wheel.

The articulated units also have pneumatic brakes controlled by a brake pedal or a manual valve. In the present invention failure of pressure in the hydraulic steering system causes air in the brake system to come under control of a pneumatic valve in the steering system to apply the brake only on the side toward which the steering wheel is turned to effect steering by braking. The system has been designed for and will be described herein for use with pneumatic brakes. However, brakes actuated by hydraulic fluid are also capable of control by the system with only such changes as would be apparent to a skilled mechanic.

The invention is more fully explained in the following specification by reference to the accompanying drawing.

The drawing is a schematic view showing a hydraulic steering circuit, a pneumatic braking circuit and the circuit for controlling the brakes selectively through actuation of the wheel in the steering circuit.

The invention will best be understood by a brief description of an existing steering system and a brief description of an existing brake system followed by an explanation of the manner in which the present invention correlates these two systems to provide emergency steering by braking.

In the drawing a steering wheel 10 controls a valve 12 through mechanism contained in a housing 14 for the steering post to direct hydraulic fluid under pressure selectively to a pair of steering jacks 16 and 18 to effect angular adjustment between a tractor and scraper about their pivotal connection 20. A portion of the tractor is shown at 22 and a small portion of the scraper at 24. Fluid from a reservoir 26 is directed by a pump 28 through a line 30 to valve 12 which is normally neutralized. Upon movement of the steering wheel 10 to the right, a lever 32 and linkage 34 adjust the valve to direct fluid under pressure to the head end of the left jack 18 through a line 36 and simultaneously to the rod end of the right jack 16 through a line 38 and passage 40. Thus extension of the left jack and retraction of the right jack causes swinging of the tractor trailer units about the pivot 20 toward the right to effect steering to the right. Followup linkage is employed as generally indicated at 42 and acts upon a lever 44 which, through adjustment within the housing 14, effects closing of the valve 12 without rotating the steering wheel back to its original position. This was designed to simulate conventional automotive steering. The followup provides a fixed ratio between steering wheel rotation and the articulation angle of the machine. Rotation of the steering wheel in the opposite direction or toward the left adjusts the valve 12 to direct fluid to the jacks 16 and 18 oppositely of the manner described and through similar lines and passages. The detailed construction of the steering mechanism is fully set forth in the Gustafson patent hereinabove referred to, and the foregoing brief description will suffice for an understanding of the present invention.

The brake system for applying brakes on the right and left wheels of the tractor is disclosed herein as a pneumatic system in which air under pressure is supplied from compressor 46 and reservoir 48 and controlled by a pedal actuated valve 50. The conduits in the brake system are illustrated in heavy black lines to distinguish from conduits employed in the present invention shown in lighter lines. Opening of the brake valve by depression of the pedal admits air under pressure from the reservoir through a line 52 to a line 54 which first closes a pair of double acting check valves 56 which close lines 58 leading from the individual wheel brake hand valve, not shown, employed in many systems for maneuverability. The pressure is then transmitted through double acting checks 60, through lines 62 and quick release valves 64, pilot operated exhaust valve 65, later to be described, and lines 66 to rotochambers 68 which apply the right and left brakes as shown.

In accordance with the present invention when the pressure in the steering system falls below a safe value it opens a normally closed pilot operated blocker valve 70 which is connected to the hydraulic steering system by a line 72 and which directs air to the auxiliary steering system through a pressure regulating valve 74 and directional selector valve 76. The selector valve 76 is connected to and is actuated by movement of the link 34 which reciprocates during rotation of the steering wheel 10 as previously described. Thus, when the wheel is turned to the right pressurized line 78 is connected with line 80 where it first actuates double acting check 60 to admit pressure to lines 62 and thence through the regular braking system to apply the right-hand brake through rotochamber 68. Similarly, motion of the steering wheel to the left pressurizes line 82, shifts double acting check 60 associated with the left brake and thence applies the brake through the conventional brake lines.

Since it is possible that steering by braking will be required while the service brakes are both applied as they may be during downhill travel, it will be necessary to release one service brake instead of, or in addition to, applying the other brake. Consequently, during a right turn with the brakes applied, pressure from the right brake line 80 will be directed through a line 86 to actuate an exhaust valve 65 in the line 66 for the left brake and consequently exhaust pressure which is applying this brake and blocks line 62. At the same time pressure is retained in the right brake rotochamber. Similarly, upon application of the left brake by pressure in the line 82 the same pressure is transmitted through line 90 to open exhaust valve 65 in the regular brake system line which applies the right-hand brake.

Thus, with the system described above loss of pressure in a standard hydraulic steering system instantly places the steering wheel thereof in control of a pressure actuated brake system for selectively applying right- and left-hand brakes to effect steering by braking.

We claim:

1. The combination of an articulated vehicle having a front portion and a rear portion connected through an articulating joint with at least one fluid actuator connected across said joint to said portions operable to articulate them and separate ground engaging means on opposite sides of said front portion, a valve connected to a source of pressure fluid and to said fluid actuator, a steering wheel connected to said valve for positioning it, and a followup linkage connected across said articulating joint and to said valve, an auxiliary steering system comprising:

two independent brake means, one associated with each of said grounding engaging means on said front portion of said vehicle;

an auxiliary brake circuit connected to said two independent brake means and a separate source of fluid pressure;

a separate selector valve in said auxiliary brake circuit operable to selectively direct fluid pressure to one or the other of said two independent brake means for actuating it; and means connecting said selector valve to said steering wheel and said followup linkage whereby one of said independent brake means will be operated when said steering wheel is turned in one direction and said other independent means will be actuated when said steering wheel is turned in the opposite direction to accomplish steering by braking until said followup linkage neutralizes the steering wheel input to said selector valve.

2. The combination defined in claim 1 wherein the two independent brake means include a primary brake circuit connected thereto and a separate actuator for simultaneous equal application of said two independent brake means 3. The combination as defined in claim 1 wherein the auxiliary brake circuit includes valve means connected therein with pressure sensitive element communicating with a hydraulic circuit of the at least one fluid actuator operable to disable said auxiliary circuit when the fluid pressure from the source of fluid pressure is above a minimum selected level during steering.

4. The combination described in claim 3 wherein valve means includes a manual override to open it.